United States Patent

Yamada

[11] Patent Number: 5,566,005
[45] Date of Patent: Oct. 15, 1996

[54] IMAGE REDUCING APPARATUS USING IMAGE DIVISION, CAPABLE OF ADJUSTING OVERLAP IN RECORDING

[75] Inventor: Masanori Yamada, Kawasaki, Japan

[73] Assignee: Canon Kabushiki Kaisha, Tokyo, Japan

[21] Appl. No.: 240,209

[22] Filed: May 9, 1994

Related U.S. Application Data

[63] Continuation of Ser. No. 931,448, Aug. 20, 1992, abandoned, which is a continuation of Ser. No. 560,867, Jul. 31, 1990, abandoned.

[30] Foreign Application Priority Data

Aug. 2, 1989 [JP] Japan ................................ 1-200479

[51] Int. Cl.$^6$ ...................................................... H04N 1/393
[52] U.S. Cl. .............................................. 358/451; 358/444
[58] Field of Search ............................ 358/450, 451, 358/404, 444; 382/47

[56] References Cited

U.S. PATENT DOCUMENTS

| | | | |
|---|---|---|---|
| 4,686,580 | 8/1987 | Kato et al. ........................ | 358/451 |
| 4,748,513 | 5/1988 | Yamada ............................. | 358/444 |
| 4,816,866 | 3/1989 | Yamada ............................. | 355/14 |
| 4,847,662 | 7/1989 | Yamada ............................. | 355/55 |
| 4,853,752 | 8/1989 | Takahashi et al. ............... | 355/204 |
| 4,899,227 | 2/1990 | Yamada ............................. | 358/452 |
| 4,905,095 | 2/1990 | Yamada ............................. | 358/451 |
| 4,907,095 | 3/1990 | Komura et al. .................... | 358/453 |
| 4,947,269 | 8/1990 | Yamada ............................. | 358/451 |
| 4,965,678 | 10/1990 | Yamada ............................. | 358/452 |

FOREIGN PATENT DOCUMENTS

| | | | |
|---|---|---|---|
| 62-230259 | 8/1987 | Japan ............................ | H04N 1/387 |
| 62-230260 | 8/1987 | Japan ............................ | H04N 1/387 |

Primary Examiner—Edward L. Coles, Sr.
Assistant Examiner—Thomas L. Stoll
Attorney, Agent, or Firm—Fitzpatrick, Cella, Harper & Scinto

[57] ABSTRACT

There is provided an image reproducing apparatus such as a copying apparatus. Such an apparatus has a dividing circuit to divide an original image into a plurality of images, a reproducing circuit for respectively enlarging the divided images and for respectively reproducing them onto different recording materials, in which the reproducing circuit partially-overlappingly reproduces the divided images onto the plurality of recording materials, a correction unit to correct enlargement ratios for enlargement of the images by the reproducing circuit in accordance with the overlap amounts, a setting circuit to set a desired enlargement ratio and a scanning unit to scan the original image. The correction unit corrects the enlargement ratio so as to reduce the overlap amount. With the apparatus, when the original image is divided and reproduced onto a plurality of recording sheets, the images can be reproduced onto a smaller number of recording sheets.

46 Claims, 16 Drawing Sheets

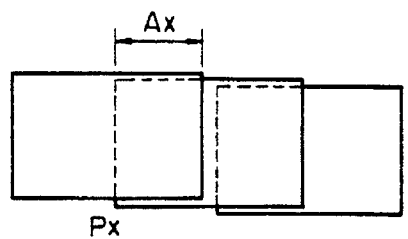
FIG. 7(A)
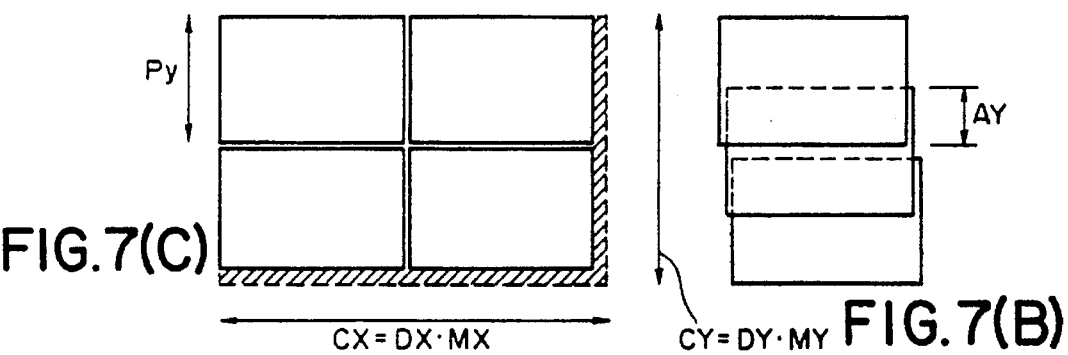
FIG. 7(C)
FIG. 7(B)
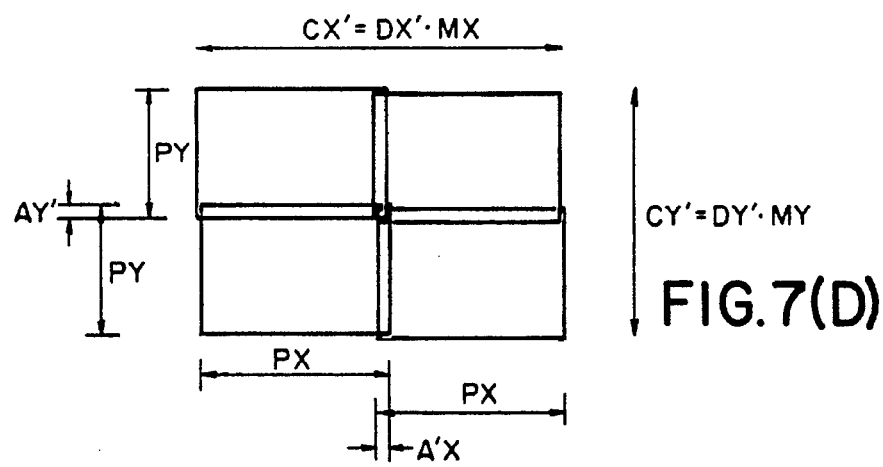
FIG. 7(D)
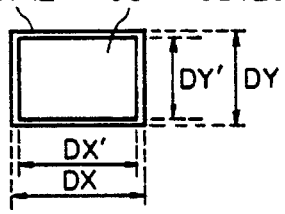
FIG. 7(E)

```
IS MAGNIFICATION MODIFIED?

▶ ( SET   X 400% )  ─  4/4 = 16        96 mm
          Y 400%                       133 mm ( OPTIMUM X 387% ) ─ 3/3 = 9         10 mm
            Y 387%                     11 mm
```

FIG.10(A)

```
IS ORIGINAL OUTLINE ERASED?

▶ ( WHOLE ) ─ 4/4 = 16                 96 mm
                                       133 mm ( ERASURE X 4mm ) ─ 3/3 = 9          10 mm
            Y 5mm                      10 mm
```

FIG.10(B)

```
MULTI-PAGE ENLARGEMENT MODE
        ①         ③            ⑤
X · ( 225 - 4 ) mm     400%         ⇒
Y · ( 320 - 5 ) mm  ×  400%
    ②    ⑧    ④    ⑪    ⑥     ⑬
A3  ×  3/3 = 9       10 mm    871 mm
                     10 mm    1240 mm
   ⑦  ⑨  ⑩      ⑫           ⑭
```

FIG.10(C)

IMAGE REDUCING APPARATUS USING IMAGE DIVISION, CAPABLE OF ADJUSTING OVERLAP IN RECORDING

This application is a continuation of application Ser. No. 07/931,448 filed on Aug. 20, 1992, now abandoned, which is a continuation application of Ser. No. 07/560,867 filed Jul. 31, 1990, now abandoned.

BACKGROUND OF THE INVENTION

1. Field of the Invention

The present invention relates to an image reproducing apparatus for reading an original image and reproducing the original image onto a recording material.

2. Related Background Art

In a conventional copying apparatus, since there is a limitation on the size of sheet which can be used, there is a case where when an enlargement copy is made, only a part of the original is obtained in the output copy.

Therefore, to avoid the above drawback, the function for automatically dividing an enlargement reproduction image of an original image and outputting the enlargement onto a plurality of sheets has been proposed in U.S. Pat. Nos. 4,853,752, 4,905,095 and 4,947,269. In the following description, such a function is called a multi-page enlargement and its idea will be described in more detail by using FIGS. 13-1 to 13-3.

FIG. 13-1 shows an original, of length DX in the main scan direction and DX in the subscan direction. (Hereinbelow, suffix X indicates the main scan direction and "Y" represents the subscan direction.) FIG. 13-3 shows a final copy output whose size is (I.e., CX by CY). The final copy output is obtained as a result of the original having been enlarged at magnifications of MX and MY. The final output comprises four sheets each having a size of (PX, PY) as shown in, for example, FIG. 13-2 and the respective sheets are adhered so as to overlap by only a length of AX or AY as shown in the diagram, so that the final copy output of FIG. 13-3 is obtained. AX is obtained by AX=2PX−DX·MX and AY is derived by AY=2PY−DY·MY.

In the case where the number of sheets is further generally expressed and NX sheets are used in the main scan direction and NY sheets are used in the subscan direction, NX is equal to the minimum integer larger than $$\frac{DX \cdot MX}{PX}$$

and NY is similarly equal to the minimum integer larger than $$\frac{DY \cdot MY}{PY}.$$

In this case, $$AX = \frac{(NX \cdot PX - DX \cdot MX)}{(NX - 1)}$$

$$AY = \frac{(NY \cdot PY - DY \cdot MY)}{(NY - 1)}$$

When NX or NY is equal to 1, AX or AY is set to 0.

The above is the idea of the function of the multi-page enlargement mentioned above. As an actual application example, the magnifications MX and MY are set by the operator, the numbers of sheets NX and NY, the overlap widths AX and AY, and the like are automatically calculated from the original size and the sheet size, and the operations are executed.

However, in the above conventional example, if the operator tries to realize the set magnification and output size at a high fidelity, it may occur that the original is divided into a larger number of sheets than expected.

That is, such a situation corresponds to the case where the value of DX·MX is very slightly larger than (NX−1)·PX or the value of DY·MY is very slightly larger than (NY−1)·PY.

In such a case, since NX×NY is selected as the number of output sheets, the overlap amounts AX and AY are larger than needed, the total number of output sheets is also large, and it is very uneconomical.

SUMMARY OF THE INVENTION

The present invention is made in consideration of the above problems, and it is an object of the invention to execute an efficient image reproduction without using recording material unnecessarily.

Another object of the invention is to reproduce images onto a smaller number of recording materials, without unnecessary use of sheets, when an original image is divided and reproduced onto a plurality of sheets of recording material.

Still another object of the invention is to enable a reproducing operation to be easily to commanded when an original image is divided and reproduced onto a plurality of sheets of recording material.

The above and other objects and features of the present invention will become apparent from the following detailed description with reference to the accompanying drawings.

BRIEF DESCRIPTION OF THE DRAWINGS

FIGS. 6-1 to 6-3 are control flowcharts for the first embodiment;

FIG. 7, consisting of FIGS. 7(A) to 7(E), is a conceptual diagram of the second embodiment;

FIGS. 8-1 and 8-2 are control flowcharts for the second embodiment;

FIGS. 10, consisting of FIGS. 10A to 10C, and 11, consisting of FIGS. 11A to 11E, are diagrams showing display examples;

FIGS. 13-1 to 13-3 are diagrams for explaining multi-page enlargement.

DETAILED DESCRIPTION OF THE PREFERRED EMBODIMENTS

The present invention will be described hereinbelow on the basis of the preferred embodiments.

Figure 1:
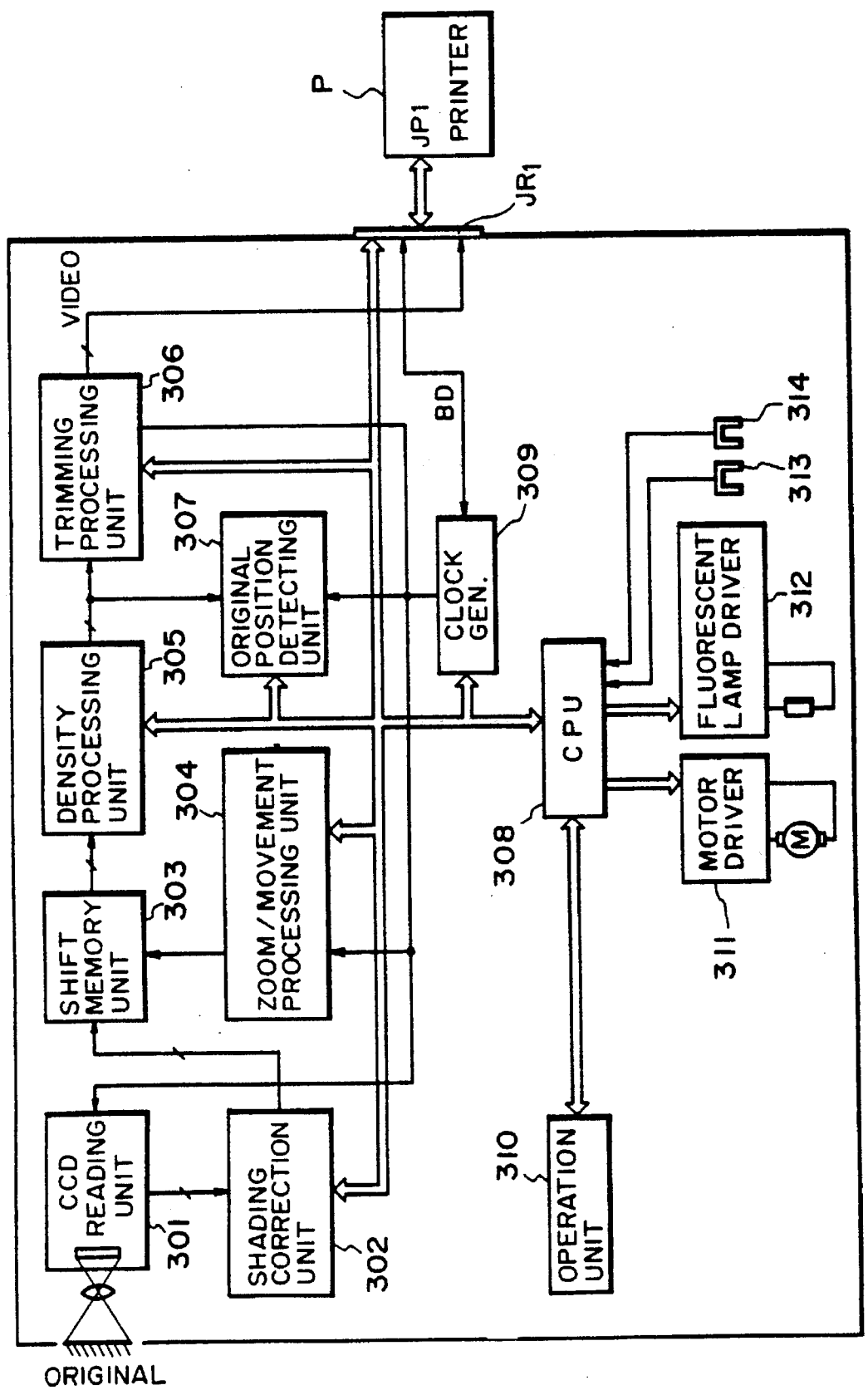
FIG. 1 is a system block diagram of a copying apparatus to which the present invention can be applied.

FIG. 1 shows a system block diagram of a digital copying apparatus to which the invention is applied.

A CCD reading unit 301 has therein: a CCD; a clock driver of the CCD; an amplifier to amplify a signal from the CCD; an A/D converter to convert the analog signal from the amplifier into a digital signal; and the like. The image data converted into a digital signal of six bits (64 gradations) is output from the CCD reading unit 301 and is input to a shading correction unit 302.

In the shading correction unit 302, after shading amounts caused by a light source, a lens, and the like are detected and corrected, the image signal is temporarily stored in a shift memory unit 303. The shift memory unit 303 has shift memories sufficient for two lines of data. When the image data of the Nth line is being written into the first memory, the image data of the (N−1)th line is read out of the second memory. In addition to the shift memories, the shift memory unit 303 also has: a write address counter to write the image data into the shift memories; a read address counter to read out the image data; and an address selector circuit to switch address signals from those two counters.

In a zoom/movement processing unit 304, the zoom or movement in the main scan direction is executed by changing the frequency of a clock to write the image signal into the shift memory unit 303, the frequency of a clock to read out the image signal from the shift memory unit 303, and the reading timing.

The image signal output from the shift memory unit 303 is input to a density processing unit 305 and is converted into the density desired by the operator and is output to a trimming processing unit 306. In the trimming processing unit 306, an arbitrary section of the image data of the main scan line is forcedly processed to "0", thereby trimming the image. On the other hand, a signal output from the density processing unit 305 is also input to an original position detecting unit 307. The detecting unit 307 detects the coordinates of the position of an original on an original base glass by using the signal which is obtained by binarizing the density signal. Thus, the original size is determined.

A CPU 308 comprises a well-known microcomputer which is constructed by: a CPU; an ROM; an RAM; a timer circuit; and I/O interface. The CPU 308 controls operation unit 310 and controls reading by CCD reading unit 301 in accordance with the setting from the operator and also controls a printer P by serial communication. Reference numeral 311 denotes a DC servo motor driver to move an optical system having a CCD in the subscan direction. The CPU 308 presets a speed corresponding to a subscan magnification. Reference numeral 312 indicates a fluorescent lamp driver for controlling the on/off operations of a fluorescent lamp (not shown) to expose the original and controlling a light quantity when the fluorescent lamp is on. Reference numerals 313 and 314 indicate position sensors for allowing the CPU 308 to know the position of the optical system.

The reader is connected to the printer through a connector $JR_1$ of the reader R and a connector $JP_1$ of the printer P. Control signals which are necessary for the image data communication and the serial communication are transmitted and received between the reader and the printer P. A horizontal sync signal BD is fetched from the printer P through the connector $JP_1$ and is input to a clock generator 309. In the clock generator 309, transmission clocks of the signal from the CCD, read/write clocks of the shift memories, and the like are generated synchronously with the horizontal sync signal BD. On the other hand, a size signal indicative of a size of each sheet set in the printer P is also output to the reader from the printer P through the connectors $JP_1$ and $JR_1$. Sheets of a plurality of different sizes can be set into the printer P.

The movement of the image in the subscan direction is realized by relatively changing the feeding timing of the sheet in the printer P and the scan starting timing of the optical system in the reader.

Figure 2:
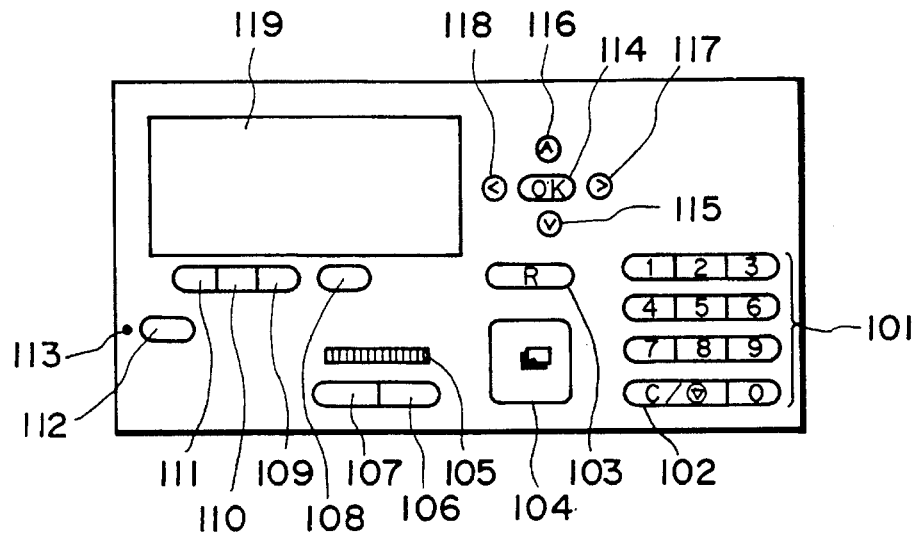
FIG. 2 is a diagram of an operation unit.

FIG. 2 shows an example of the operation unit 310 of the copying apparatus and explanation will now be made.

Reference numeral 101 denotes a ten-key group used to set the number of copies or the like; 102 indicates a clear/stop key to request clearing of the number of copies and for stopping operation; 103 a reset key to reset the copying mode to the normal mode; 104 a start key to start the copying operation; and 106 and 107 keys to adjust a copy density. The result of the adjusted density is indicated by an indicator 105.

Reference numeral 108 denotes a selection key to select a desired paper feed stage; 110 a key to set a copy magnification to equal (100%, i.e., no change in size) magnification; 109 an enlargement magnification selection key; 111 a reduction magnification selection key; and 112 a key to select or reset a multi-page enlargement mode. When the key 112 is selected, an indicator 113 is lit.

Reference numeral 119 denotes a liquid crystal display (LCD) unit having a dot matrix construction; 115, 116, 117, and 118 indicate control keys which are used to select or change the display content of the LCD unit 119; and 114 represents an OK key which is used to confirm the contents selected by the keys 115 to 118 and to update the content on the display screen of the LCD unit 119.

Figure 3:
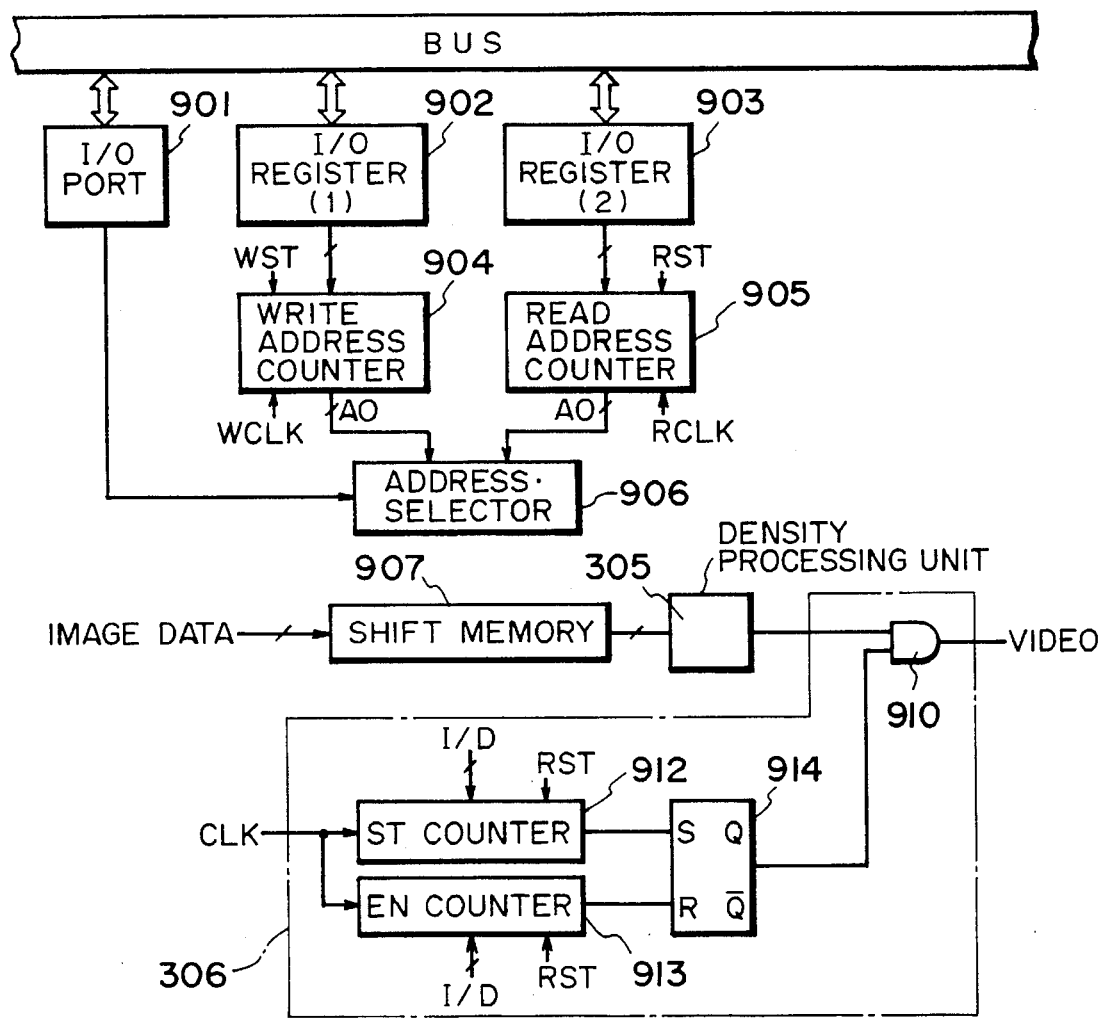
FIG. 3 is a diagram regarding a shift memory.

FIG. 3 shows a circuit diagram regarding the shift memory unit 303. As mentioned above, although shift memories for two lines are provided in the shift memory unit 303, since the controls of the shift memories serve the memories in common, control construction with respect to only one of the shift memories is shown in FIG. 3. A write address counter 904 is an address counter which is used when data is written into a shift memory 907. A read address counter 905 is an address counter which is used when data is read out of the shift memory 907. An address selector 906 receives a command from the CPU 308 through an I/O port 901 and selects either an address signal of the write address counter 904 or an address signal of the read address counter 905, thereby addressing the shift memory 907.

Reference numerals 902 and 903 denote I/O registers for allowing the CPU 308 to respectively give preset values to the write address counters 904 and read address counters 905. By relatively changing the two preset values, the movement of the image in the main scan direction is realized.

Both the write address counter 904 and the read address counters 905 are down counters. A WST signal and an RST signal to instruct the start of the counting operation are input to the counters 904 and 905, respectively. On the other hand, a write clock WCLK to the shift memory 907 and a read clock RCLK from the shift memory 907 are input to those counters. For instance, in the case of the ½ reduction, the frequency of the write clock WCLK is set to ½ of the frequency of a transfer clock CLK. In the case of two-time enlargement, the frequency of the read clock RCLK is set to ½ of the frequency of the transfer clock CLK.

Reference numeral 306 denotes the trimming processing unit 306 shown in FIG. 1. The trimming processing unit 306 outputs the area in a frame which is determined by an ST counter 912 and an EN counter 913 as an output image and masks (trims off) the area outside of the frame.

Reference numeral 910 denotes an AND gate for controlling the output of the image data output from the shift memory 907 and transmitted through the density processing unit 305, and for outputting that data as a signal VIDEO.

The signals to the counters 912 and 913 are output from the CPU 308 in the mode designated by the operator.

The ST counter 912 and the EN counter 913 are the start bit counter and the end bit counter each for outputting an image to only a determined area. The CPU 308 presets count data for gating into those counters through an I/O port.

A flip-flop 914 is set by the counting-up operation of the ST counter 912 and is reset by the counting-up operation of the EN counter 913. Therefore, the AND gate 910 outputs the image data for a period of time from the count-up of the ST counter 912 until the count-up of the EN counter 913.

Figures 1, 13:
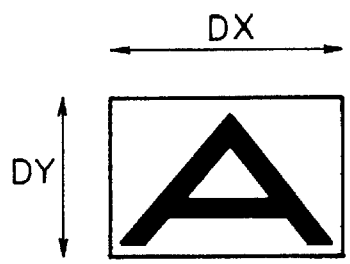
Figures 2, 13:
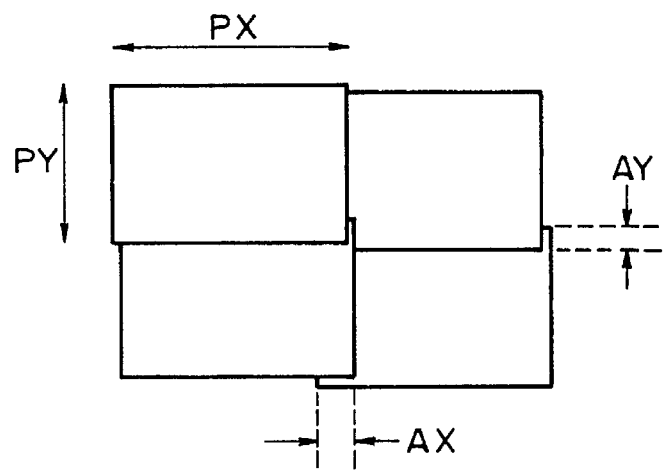
Figures 3, 13:
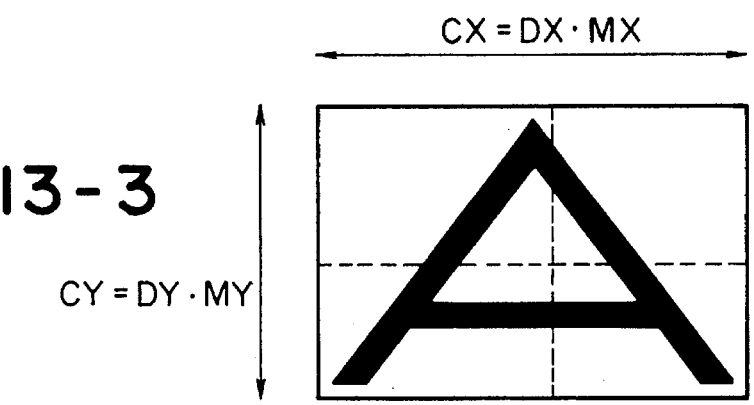

As mentioned above, the multi-page enlargement shown in FIGS. 13-1 to 13-3 can be executed by combining the functions such as trimming output of an arbitrary portion of an original image and the zoom and movement which can be respectively independently executed in the main scan direction and subscan direction.

Figure 4A:
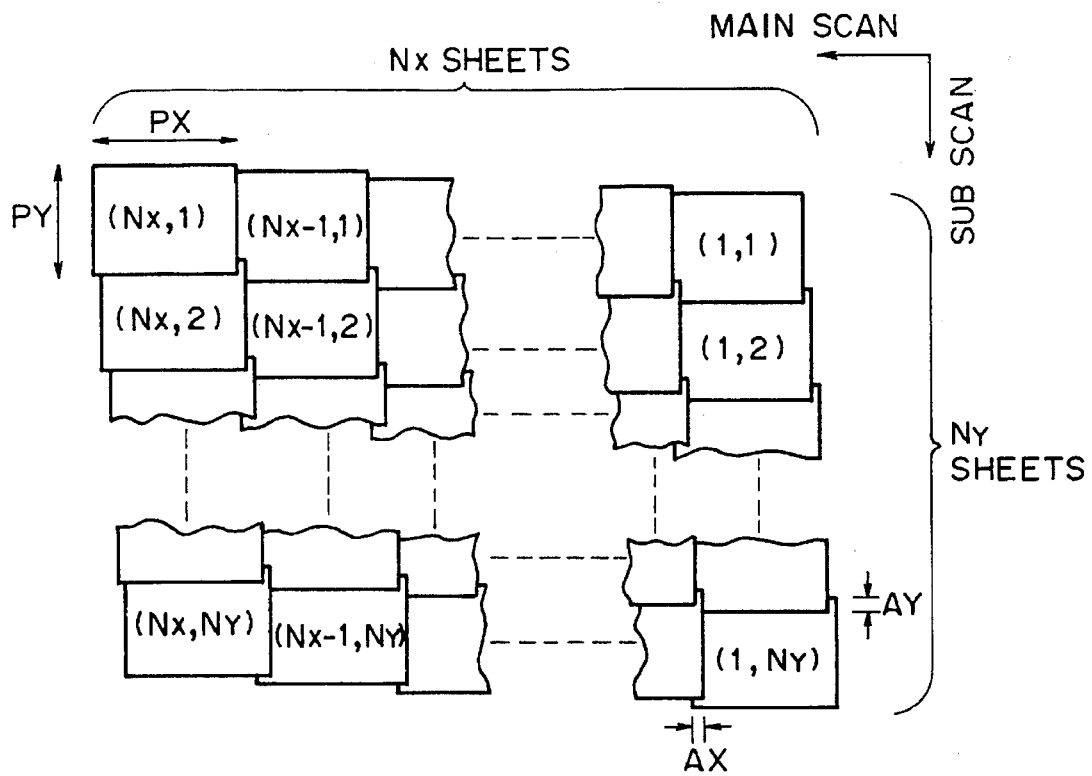
FIGS. 4A and 4B are diagrams for explaining multi-page enlargement copying procedures.
Figure 4B:
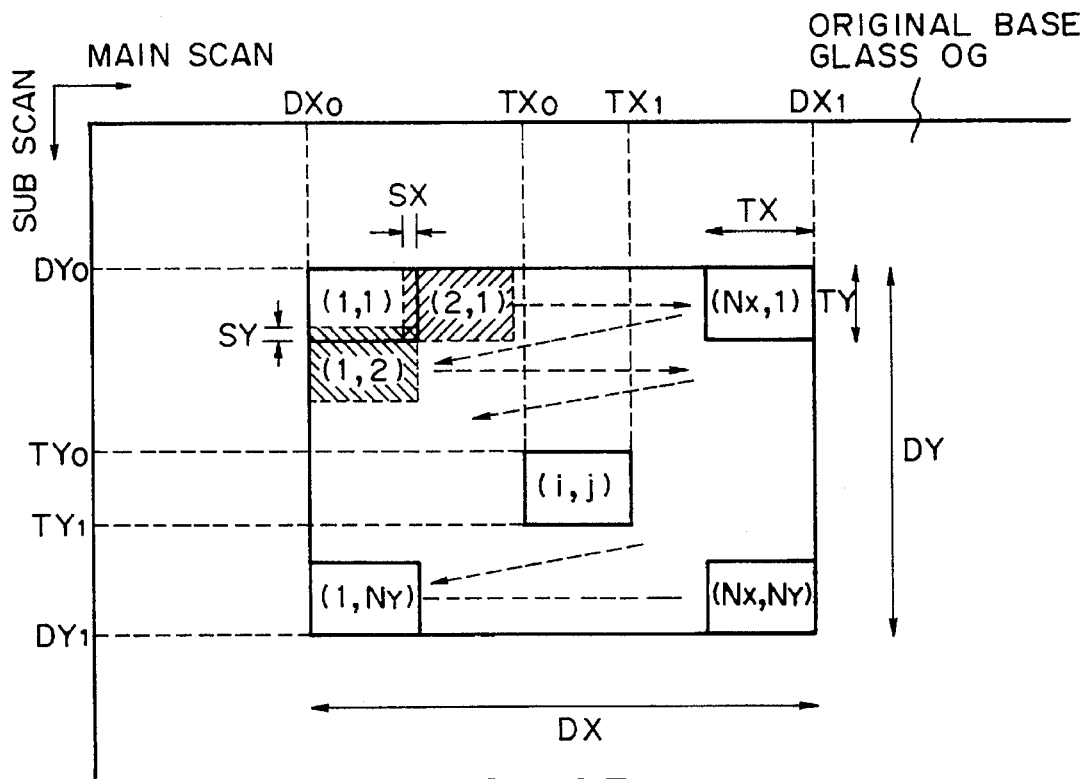

FIGS. 4A and 4B show conceptual diagrams of a processing procedure for the multi-page enlargement.

FIG. 4A shows a state of a final output which is constructed by (NX×NY) sheets each having the size of (PX, PY). FIG. 4B shows a state in the case where the original of the size of (DX, DY) is trimmed.

As shown in FIG. 4B, the original of the size (DX, DY) set at the positions $(DX_0, DY_0)$ and $(DX_1, DY_1)$ on an original base glass OG is divided into the NX areas in the main scan direction and the NY areas in the subscanning directions in a manner similar to the number of final output sheets. One area has a size of (TX, TY). The adjacent areas overlap by only the length of SX in the main scan direction and by only the length of SY in the subscan direction. Since the magnifications are set to MX and MY, there are the relations SX=AX/MX and SY=AY/MY among the overlap amounts AX and AY in the sheets and the overlap amounts SX and SY in the original. On the other hand, there are the relations TX=PX/MX and TY=PY/MY among the sheet size (PX, PY) and the trimming size (TX, TY).

The final output shown in FIG. 4A is obtained by enlargedly copying the areas onto the sheet by trimming the original in the order, for instance, of (1, 1), (2, 1), . . . , (NX, 1), (1, 2), . . . , (NX, 2) , . . . , (1, NY) , . . . , (NX, NY).

Figure 5A:
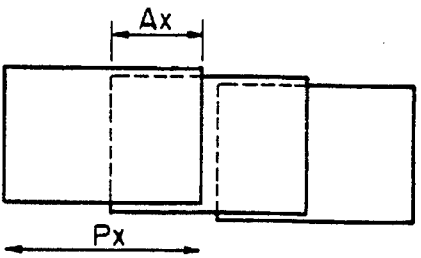
FIG. 5, consisting of FIGS. 5(A) to 5(D), is a conceptual diagram of the first embodiment.
Figure 5C:
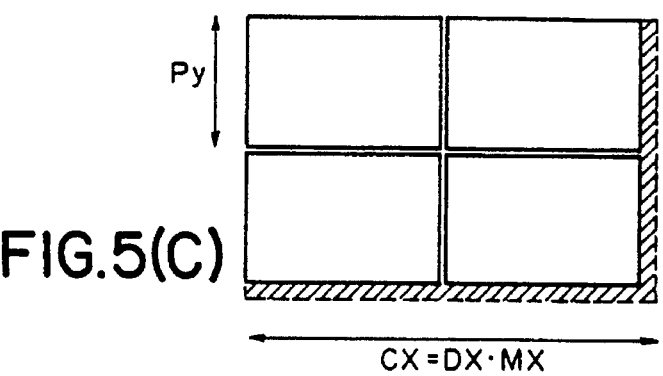

As shown in FIGS. 5(A)–5(D), in the case where the size of original is set to (DX, DY) and the magnifications are set to MX and MY, the output size is set such that CX=DX·MX and CY=DY·MY. When the operator tries to construct such an output with sheets of the size of (PX, PY), for instance, as shown in FIG. 5(C), there occurs a case where when the number of sheets is set to (2×2), the hatched portions are not covered, the amount of lack being CX and CY.

Figure 5B:
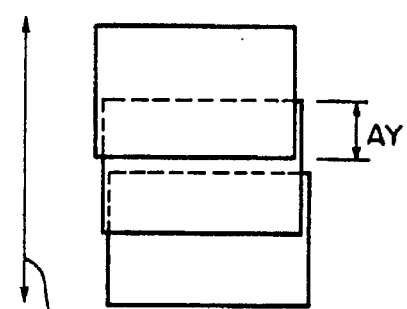
Figure 5D:
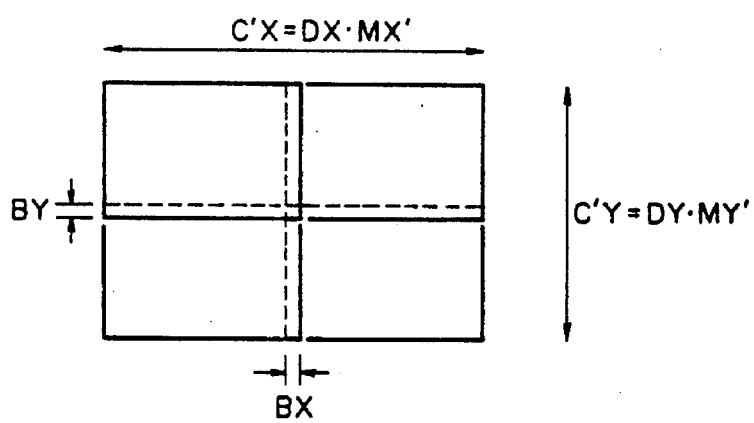

In such a case, to satisfy CX and CY, as shown in FIGS. 5(A) and 5(B), it is sufficient to construct the final output image by the sheets comprising three sheets in the vertical direction and three sheets in the lateral directions. However, the overlap widths among the sheets are set like AX and AY and are almost half of the sheet size, so that such a construction is very uneconomical. In the above case, as shown in FIG. 5(D), it is more convenient for the operator that the size (C'X, C'Y) which is obtained by overlapping the (2×2) sheets each having the size of (PX, PY) by only the amounts of BX and BY is given as a final output.

The copy magnifications at this time are set such that M'X=C'X/DX and M'Y=C'Y/DY. BX and BY denote the proper amounts which have been predetermined in order to overlappingly adhere the sheets.

Figures 1, 6:
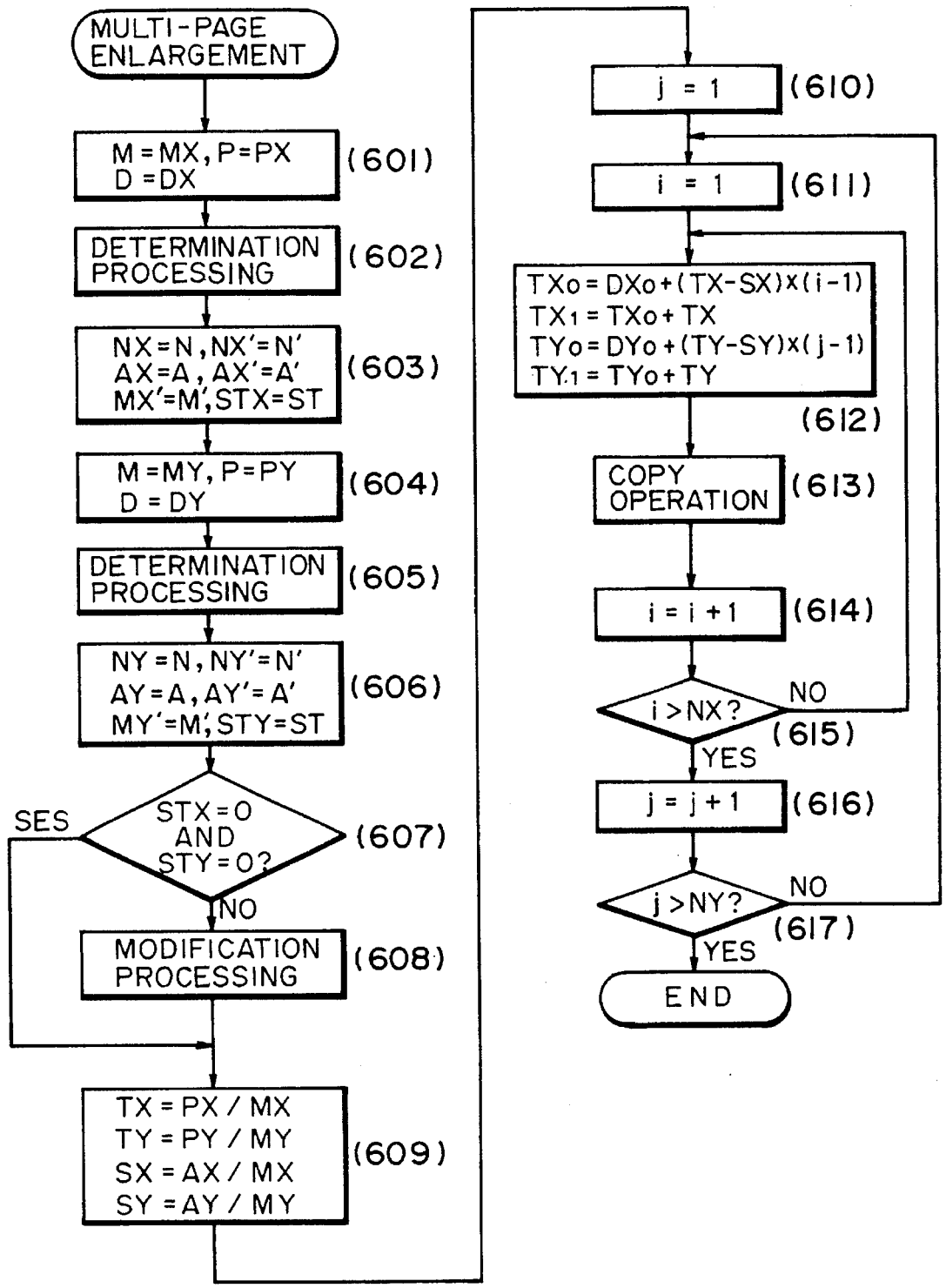
Figures 2, 6:
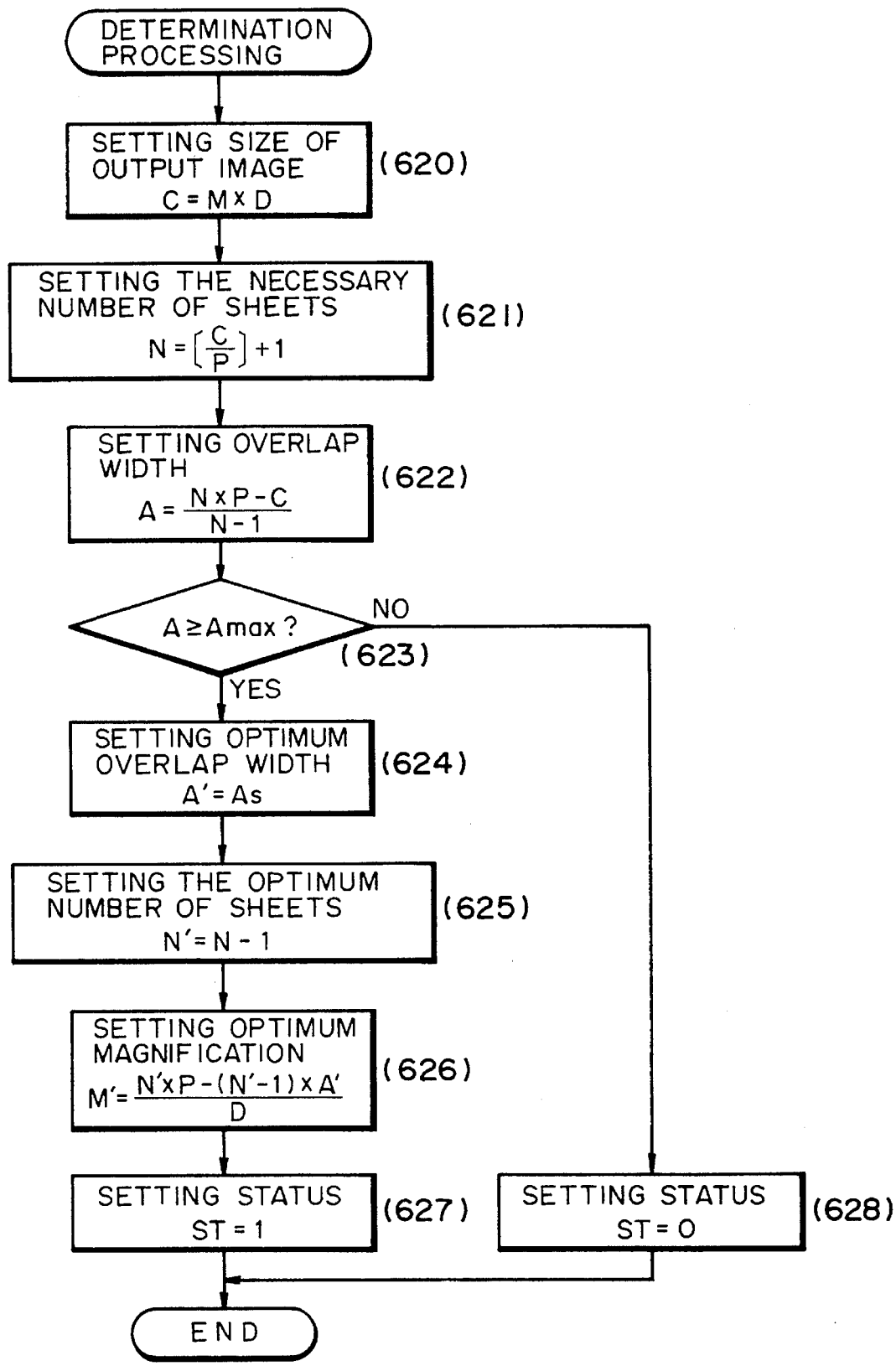
Figures 3, 6:
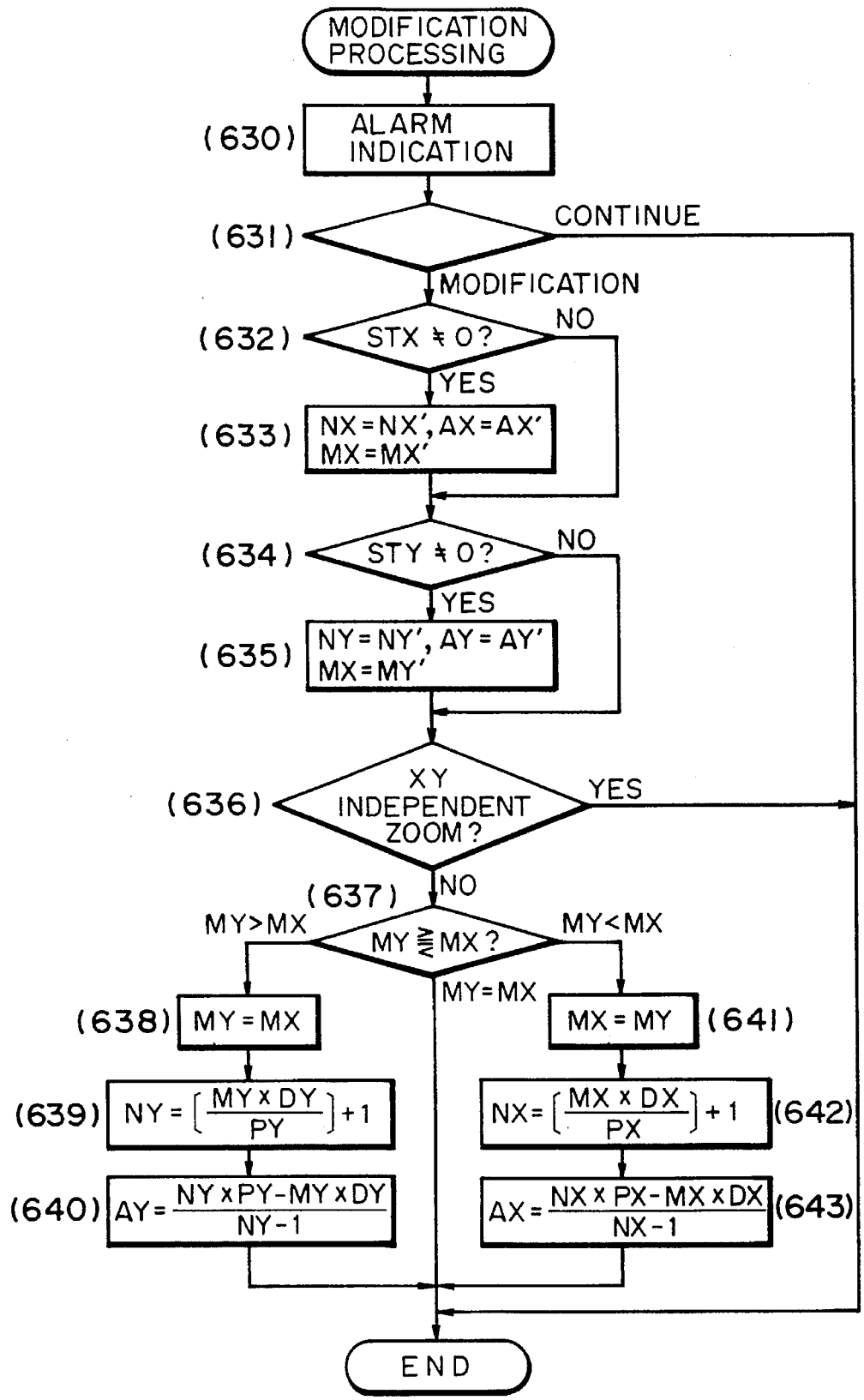

FIGS. 6-1 to 6-3 show control procedures of the CPU 308 to realize the processes in FIG. 5(D) and explanation will now be made.

The main scan magnification MX, the main scan length PX of the sheet and the main scan length DX of the original are first set into areas M, P, and D in the RAM (step 601). A determination processing is executed (602).

FIG. 6-2 shows a detailed procedure for the determination processing and explanation will now be made.

First, an output length C is obtained (620) from the magnification M and the original length D which were set in step (601). The necessary number N of sheets is calculated from the output length C and the sheet length P by the equation N=[C/P]+1 (621). [(C/P)] denotes the maximum integer smaller than C/P.

Then, an overlap amount A is obtained from the necessary number N of sheets, sheet length P, and output length C by the equation A=(N×P−C)/(N−1) (622). The overlap amount A is compared with a predetermined reference value Amax (623). When the overlap amount A is larger than or equal to Amax, it is determined that there is a fear such that the recording sheets are used in vain as described in FIGS. 5(A) and 5(B). A predetermined overlap amount As is set into an area A' in the RAM (624). On the other hand, (N−1) which is smaller than the inherent necessary number N of sheets by "1" is set into an area N' in the RAM as the optimum number of sheets (625). An optimum magnification M' is calculated by M'=(N'×P−(N'−1)×A')/D from the values of N' and A' and the foregoing sheet length P and original length D (626). After that, "1" is set as a status into an area ST in the RAM as a case where there is a fear of vain copy (627) and the processing routine is finished. When A is smaller than Amax in step (623), "0" is set as a status into the area ST in the RAM (628).

Returning to step (603) in FIG. 6-1, the necessary number N of sheets, the optimum number N' of sheets, the overlap width A, the optimum overlap width A', the optimum magnification M', and the status ST as the results of the above discrimination are set into areas NX, NX', AX, AX', MX', and STX in the RAM, respectively (603). X is a suffix indicative of the main scan. The procedure in steps (601) to (603) is also executed with respect to the subscan and the results of the discrimination are set into areas NY, NY', AY, AY', MY', and STY in the RAM (604, 605, 606).

Then, statuses STX and STY in the RAM are checked (607). When both of the STX and the STY are set to "0", it is determined that the magnifications MX and MY which were set by the operator are proper. A trimming area size (TX, TY) and trimming area overlap amounts SX and SY which have been described in FIGS. 4A and 4B are calculated on the basis of the magnifications MX and MY, overlap widths AX and AY, and the numbers NX and NY of sheets (609). Then, the processing routine advances to the copy operation in step (610) and subsequent steps.

In order to execute the copy operation in accordance with the order described in FIGS. 4A and 4B, an initial value "1" is set into counters i and j in the RAM (610, 611). The counter i indicates the trimming order in the main scan direction. The counter j represents the trimming order in the subscan direction. The coordinates indicative of four vertices of the trimming area are calculated by using the count values of the counters i and j in the following manner (612):

$$TX_0 = DX_0 + (TX - SX) \times (i-j)$$

$$TX_1 = TX_0 + TX$$

$$TY_0 = DY_0 + (TY - SY) \times (j-1)$$

$$TY_1 = TY_0 + TY$$

As shown in FIG. 4B, $TX_0$, $TX_1$, $TY_0$, and $TY_1$ denote a main scan starting position, a main scan ending position, a subscan starting position, and a subscan ending position of the trimming area.

The area calculated as mentioned above is trimmed, enlarged, and copied (613). After that, the count value of the main scan counter i is first increased by "1" (614). A check is made to see if the new count value has exceeded the main scan dividing number NX or not (615). If NO, the processing routine is returned to step (612). If YES, the count value of the subscan counter j is increased by "1" (616). A check is made to see if the new count value has exceeded the subscan dividing number NY or not (617). If NO, the processing routine is returned to step (611). The main scan counter i is initialized to "1" and the processes in step (612) and subsequent steps are executed. If YES in (617), the copy operation is finished.

If at least one of STX and STY is not set to "0" in (607), it is determined that the set magnifications are not always optimum (608). The data modification processing is executed (608) and the processes in step (609) and subsequent steps are then executed. FIG. 6-3 shows a procedure for the modification processing.

In the modification processing, an alarm indication of the following message is first performed to the operator by the LCD unit 119 (630). For instance, if it is determined that the STX is set to "1", namely, it is improper, the following message is displayed.

"If the copy is executed at the set magnification MX, the overlap amount is set to AX in the output of the NX sheets. If the magnification is set to MX', the overlap amount is set to AX' in the output of (NX−1) sheets. Do you want to continue in the first set state or to modify the magnification to MX'?"

If the operator wants to continue, the data is not modified. However, if the operator wants to modify (631), when STX=1 (632), the optimum magnification MX', the optimum overlap width AX', and the optimum number NX' of sheets are reset to MX, AX, and NX (633). When STY=1 as well (634), MY', AY', and NY' are also similarly reset to MY, AY, and NY (635). If the initial set zoom mode is not the XY independent zoom, namely, if the main scan magnification and the subscan magnification are equal (636), a check is made to see if the magnifications MX and MY which were reset by the above procedure are equal or not (637). If MY>MX, the value of MY is modified to the value of MX (638). The necessary number NY of sheets and the overlap amount AY are again calculated (639, 640). If MX>MY, the value of MX is modified to the value of MY (641) and NX and AX are again calculated (642, 643).

After the modification process was finished by the above procedure, the calculations and the copy operation in steps (609) to (617) in FIG. 6-1 are executed on the basis of the modified data.

The data can be also automatically modified without executing the alarm indication in step (630) and the selection by the operator in step (631).

On the other hand, Amax which is used to compare with the overlap amount A and has been mentioned in FIG. 6-2 is not limited to only a predetermined length but can be also set to a value corresponding to a predetermined rate of the sheet length P. Further, in addition to the optimum overlap width As, the values of As and Amax can be also preset by the operator.

By determining the overlap amount calculated on the basis of the magnification set by the operator as mentioned above, a multi-page enlargement output of the size which the operator can almost satisfy can be economically executed.

Practical examples of the numerical values and indications will now be mentioned.

For instance, when the main scan length of the original size is set to 225 mm and the subscan length is set to 320 mm, if the operator tries to enlarge the original image to the sheet of the A3 size (297 mm×420 mm) at the magnification of 400%, the output size is set to 900 mm×1280 mm. If such an output size is constructed by using the sheets of the A3 size, every four sheets are used in the vertical and lateral directions and the overlap amounts of the sheets are set to at least 96 mm and 133 mm. However, if it is sufficient to set the output size to a value of almost four times as a rate of the length of the original size, by suppressing the magnification to 387%, the output size is set to 871 mm×1238 mm. Therefore, such an output size can be constructed by using total nine sheets of the A3 size (three sheets in the vertical direction×three sheets in the lateral direction). On the other hand, the overlap amounts in the above case are set to 10 mm and 11 mm and waste of sheets is prevented.

An example of the display in the LCD unit 119 (FIG. 2) in the above case is shown in FIG. 10A.

If the operation is continued on the basis of the set magnifications, the start key 104 is depressed in this state. If the modification is desired, the optimum data are selected by using the control keys 115 and 116 and, thereafter, the start key 104 is depressed.

In the above-described embodiment, the zoom ratio is properly corrected. However, in the case where the operator needs the accurate zoom ratio, such a method is inconvenient; as will now be described.

FIGS. 7(A), 7(B) and 7(C) are the same diagrams as are FIGS. 5(A), 5(B) and 5(B). For the output size (CX, CY) obtained by multiplying the set magnifications MX and MY to the original size (DX, DY), if total four sheets having the size (PX, PY) (two sheets in the vertical direction and two sheets in the lateral direction) are used, the hatched portion lacks. Therefore, as shown in FIGS. 7(A) and 7(B), it is necessary to use every three sheets in the vertical and lateral directions by expending the overlap amounts AX and AY which are equal to almost ½ of the sheet length.

In the above case, in the second embodiment, as shown in FIG. 7(E), the area corresponding to the size (DX', DY') in the original size (DX, DY) is multi-page enlarged as an object area. Thus, as shown in FIG. 7(D), it is possible to perform the multi-page enlargement corresponding to the output size of (CX'=DX'·MX, CY'=DY'·MY) such that it can be constructed by using two sheets of each direction, size (PX, PY) in the vertical and lateral.

In this case, the magnifications which were set by the operator are accurately held, and cutting the peripheral portion which ordinarily does not have any information on the original, does not drop any information, and thus such a method is practical.

Further, as will be explained hereinlater, even in the case of needing the information in the peripheral portion, by waiting for the judgment of the operator, the copy which the operator does not desire can also be avoided.

The fundamental control procedure of the second embodiment can be realized by the procedure shown in FIG. 6-1 in almost the same manner as that in the first embodiment. However, since the determination processings (601 and 605) and the modification processing (608) are different from those in the second embodiment, their different flows are shown in FIGS. 8-1 and 8-2 and will now be explained.

Figures 1, 8:
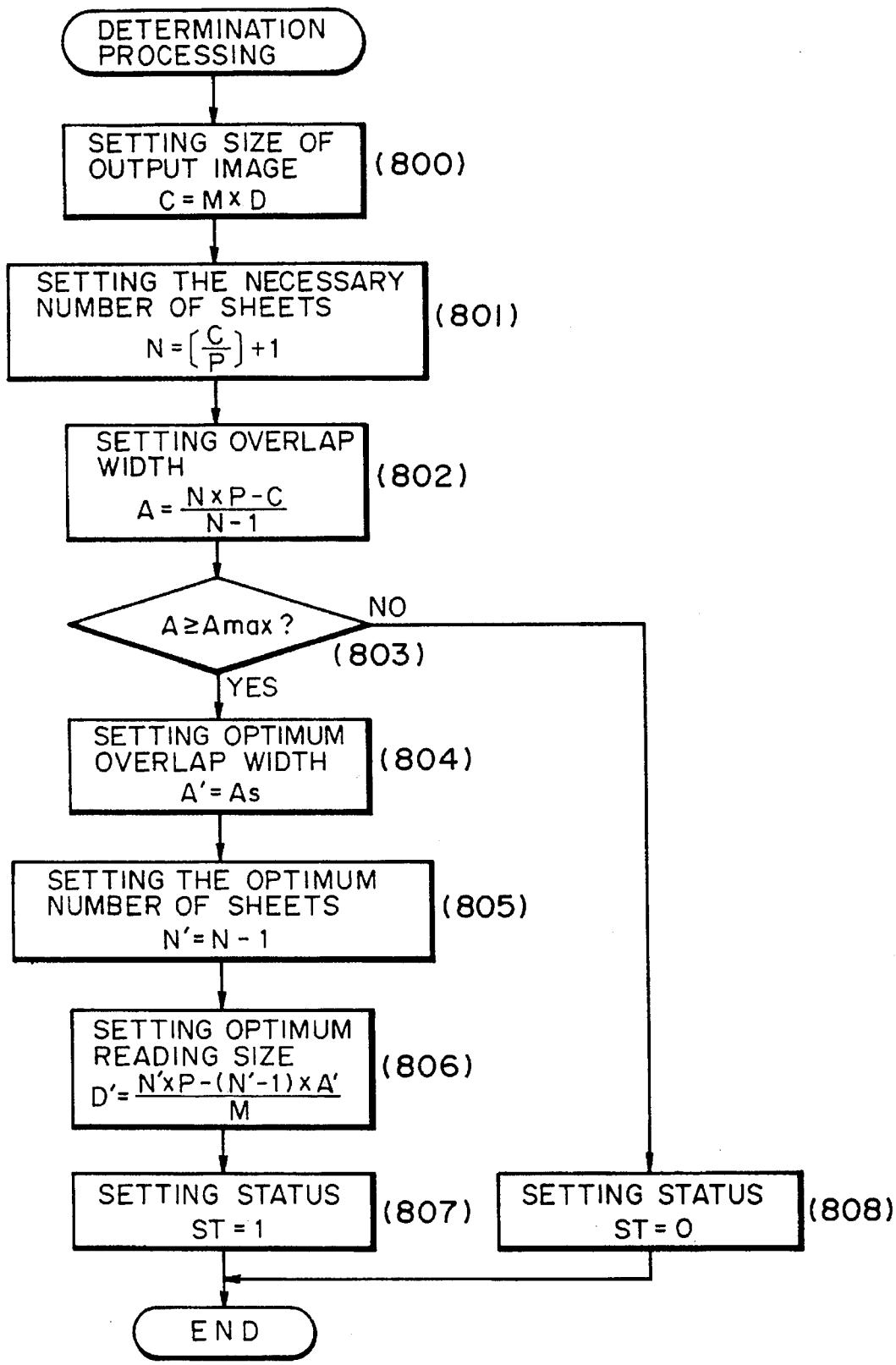
Figures 2, 8:
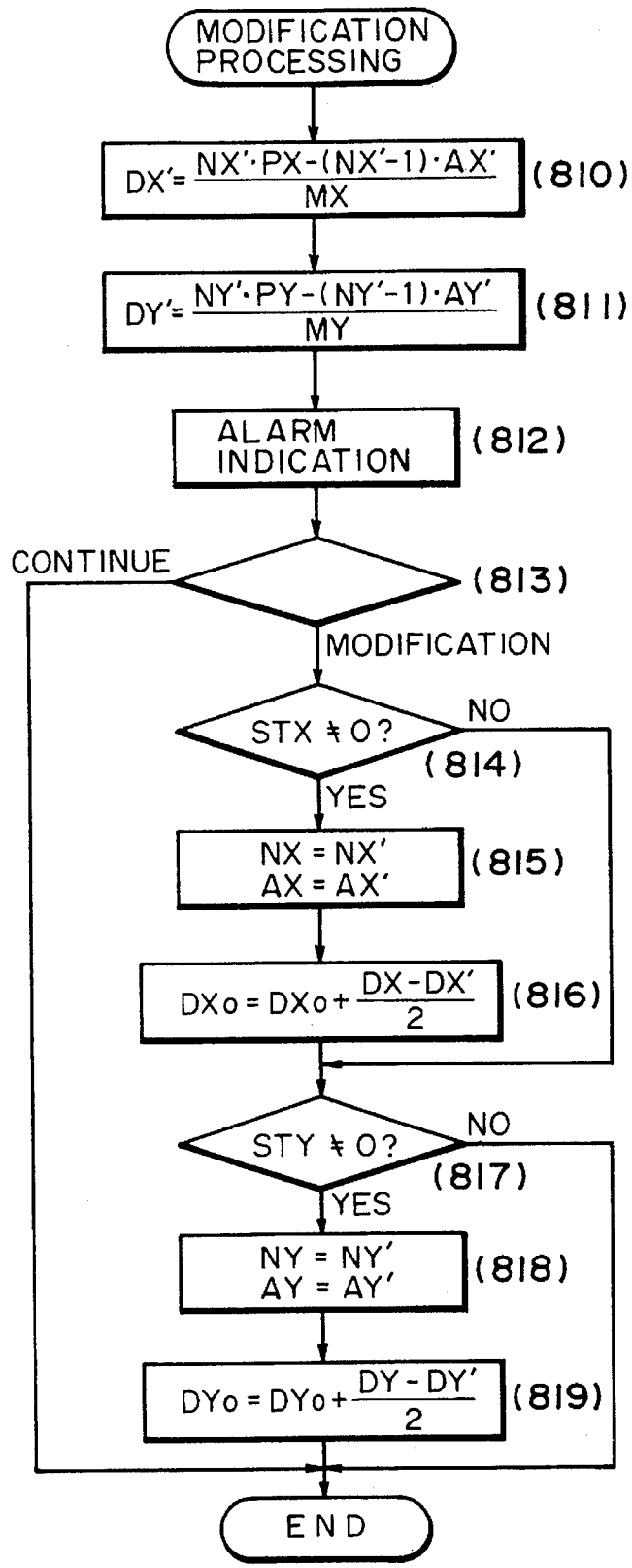

In the determination processing flow shown in FIG. 8-1, a process in step (806) differs from that in FIG. 6-2. In the first embodiment, the magnification is corrected in step (626) in FIG. 6-2. However, in the second embodiment, a reading area in the original is corrected without changing the magnification.

In the modification processing flow shown in FIG. 8-2, the corrected reading area is first set into the areas DX' and DY' in the RAM (810, 811). The values of DX' and DY' are calculated in (806) in FIG. 8-1 by using the sheet size (PX, PY), magnifications MX and MY, corrected numbers NX' and NY' of sheets, and corrected overlap amounts AX' and AY' in the following manner:

$$DX' = \frac{NX' \cdot PX - (NX' - 1) \cdot AX'}{MX'}$$

$$DY' = \frac{NY' \cdot PY - (NY' - 1) \cdot AY'}{MY'}$$

After that, an alarm of the following message is indicated by the LCD unit (812). For instance, if both of STX and STY are not set to "0", the following message is displayed.

"If the copy is executed in the set mode, the (NX·NY) sheets are output. However, if the peripheral portion of the original is erased by only the size of ((DX–DX')/2, (DY–DY')/2), it is sufficient to output ((NX–1)·(NY–1)) sheets. Do you want to continue the copy operation on the basis of the initial set data or do you want to modify the mode and to erase the peripheral portion?"

If the operator desires to continue, the modification processing is finished (813). If the operator desires to modify (813), when STX is not set to "0" (814), the data NX' and AX' after the modification are set to the number of output sheets, that is, the dividing number NX and the overlap amount AX of the output sheets (815). The starting coordinate $DX_0$ of the original area to be copied is corrected by only the width $DX-DX'/2$ of the peripheral range to be erased (816). With respect to the subscan as well, when STY is not set to "0" (817), NY, AY, and $DY_0$ are similarly corrected (819).

After the data is modified as mentioned above, by executing the copy operation in accordance with the procedure in step (610) and subsequent steps in FIG. 6-1, it is possible to perform the economical multi-page enlargement copying in which the set magnifications are accurately held and no information is dropped out and the output of the necessary minimum number of sheets is derived.

Figure 9:
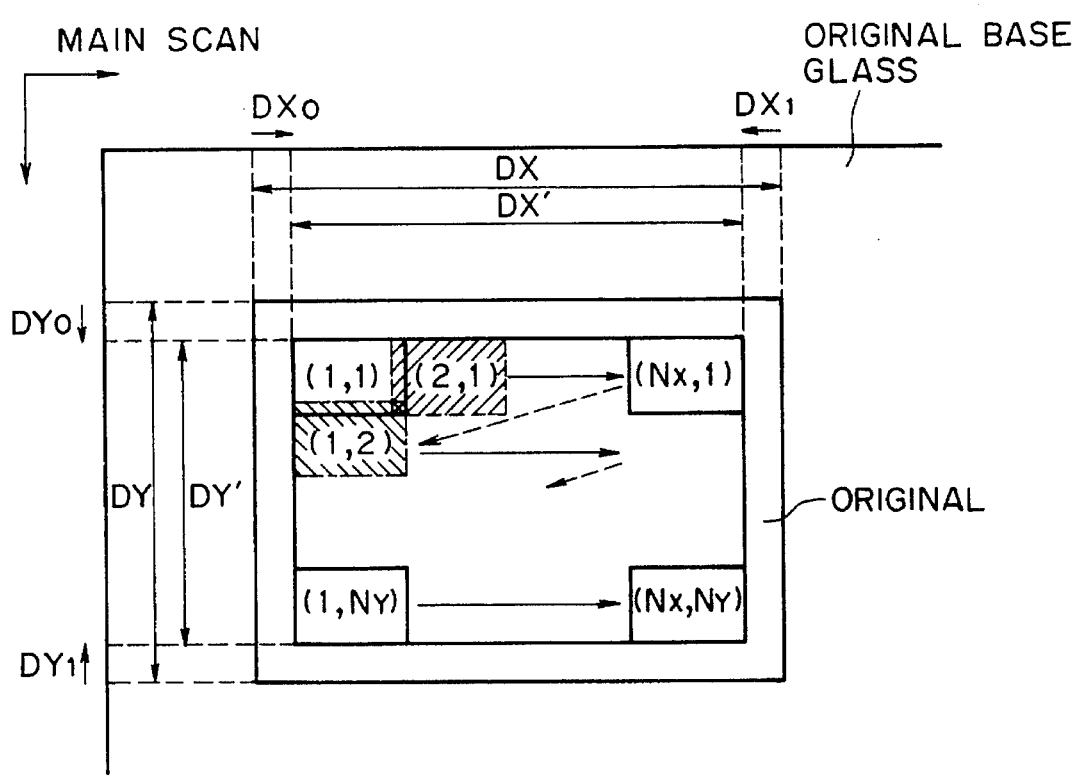
FIG. 9 is an explanatory diagram of a copying procedure in the second embodiment.

FIG. 9 is a diagrammatical view showing the above state. That is, FIG. 9 shows a state in which the multi-page enlargement is executed on the images in the areas of $DX_0$ and $DY_0$ in the original of the size (DX, DY).

Practical examples of numerical values and displays will now be mentioned. In a manner similar to the above, in the case of outputting the original of 225 mm×320 mm to the sheet of the A3 size at the magnification of 400%, if the whole surface of the original is copied without a dropout of any information, every four sheets in the vertical and lateral directions are needed and the overlap amounts are set to 96 mm and 133 mm. However, if the peripheral portion of the original is erased by the amount of 3.5 mm in the main scan direction and by the amount of 5 mm in the subscan direction, the actual reading area in the original is set to (218 mm×310 mm). If such a reading area is enlarged at the magnification of 400%, the necessary output size is set to (872 mm×1240 mm). Such an output size can be constructed by using every three sheets of the A3 size in the vertical and lateral directions. The overlap amounts are also set to 9.5 mm and 10 mm. Therefore, the above method is economical.

At this time, a message is displayed as shown in, for instance, FIG. 10B. In the case of copying on the basis of the set data, the start key 104 is depressed in this state. If the operator desires to erase the peripheral portion, after the erasing mode was selected by using the control keys 115 and 116, the start key 104 is depressed.

In the above first and second embodiments, the operator sets the copy magnification. The third embodiment in which the output size is set will now be described hereinbelow.

FIGS. 11A–E shows examples of the display in the third embodiment and explanation will now be made.

Figure 11A:
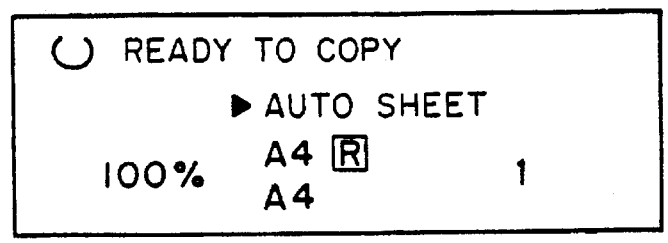

When the power source is turned on or when the reset key 103 is depressed, the LCD unit 119 displays as shown in FIG. 11A and indicates the fundamental copy mode such as copy magnifications, sheet size, and number of copies.

Figure 11B:
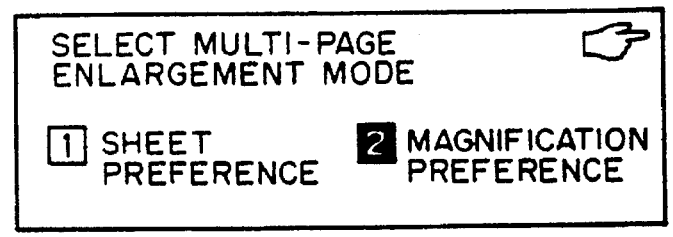
Figure 11C:
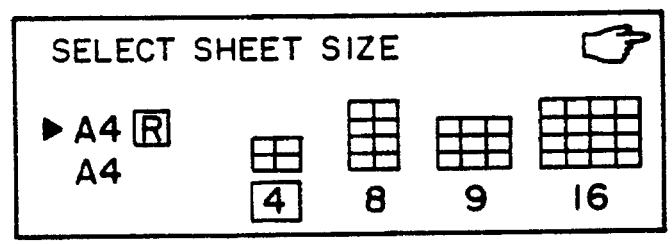

When the multi-page enlargement key 112 is depressed, the LCD unit 119 displays as shown in FIG. 11B. It is possible to select either one of the two "SHEET PREFERENCE" and "MAGNIFICATION PREFERENCE" modes. At this time, each time the control key 117 or 118 is depressed, the above two modes are alternately selected and, for instance, a part of the display content in the selected mode is reversed as shown in FIG. 11B.

When the OK key 114 is depressed in a state in which the "SHEET PREFERENCE" mode was selected on the display screen of the LCD unit 119 shown in (B) in FIG. 11, the LCD unit displays as shown in (C) in FIG. 11. The size of sheets which were set and the patterns of the numbers of constructing sheets for the multi-page enlargement copy output are displayed. At this time, the sheet size can be selected by the control key 115 or 116 or the feed selection key 108. The constructing sheet number pattern can be selected by the control key 117 or 118. In the display example of FIG. 11C, it is shown that A4R, that is, the mode to feed the A4-size sheet in the vertical direction was selected as a sheet size and the pattern of total four sheets comprising two sheets in the vertical direction and two sheets in the lateral direction was selected as an output constructing pattern.

Figure 11D:
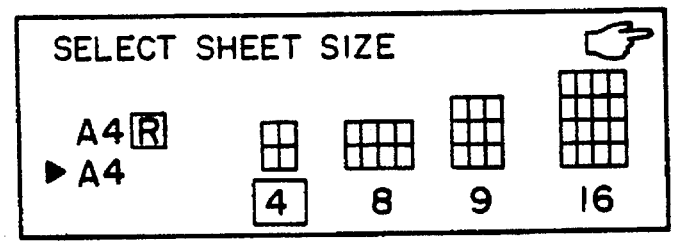

In the example shown, in addition to the pattern of 2×2 sheets, three patterns such as 8 sheets of 4×2, 9 sheets of 3×3, and 16 sheets of 4×4 are prepared as patterns. By selecting the output size as the number of constructing sheets, the operator can more sensitively set a desired output mode and the operability can be improved. On the display screen of FIG. 11C, if A4, namely, the mode to feed the A4 size sheet in the lateral direction is selected as a sheet size, the LCD unit 119 displays as shown in FIG. 11D. The direction of each of the drawings showing the output patterns is changed and the output patterns can be visually easily recognized.

Figure 11E:
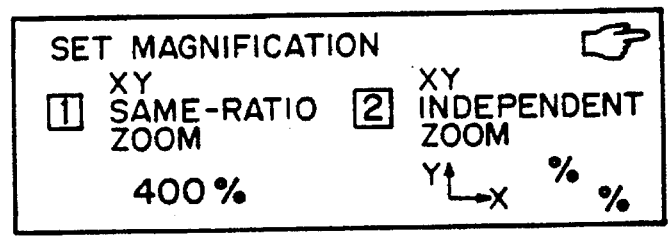

On the other hand, in the display screen of FIG. 11B, if the "MAGNIFICATION PREFERENCE" mode is selected, the LCD unit displays as shown in FIG. 11E. In FIG. 11E, either one of the "XY same-ratio zoom" mode and the "XY independent zoom" mode can be selected by the control keys 117 and 118. Further, it is possible to select which one of the "Y" magnification and the "X" magnification in the "XY independent zoom" is set. On the other hand, the magnification data in the selected zoom mode can be changed by the control keys 115 and 116. The "MAGNIFICATION PREFERENCE" mode corresponds to the cases of the foregoing first and second embodiments.

Figure 12A:
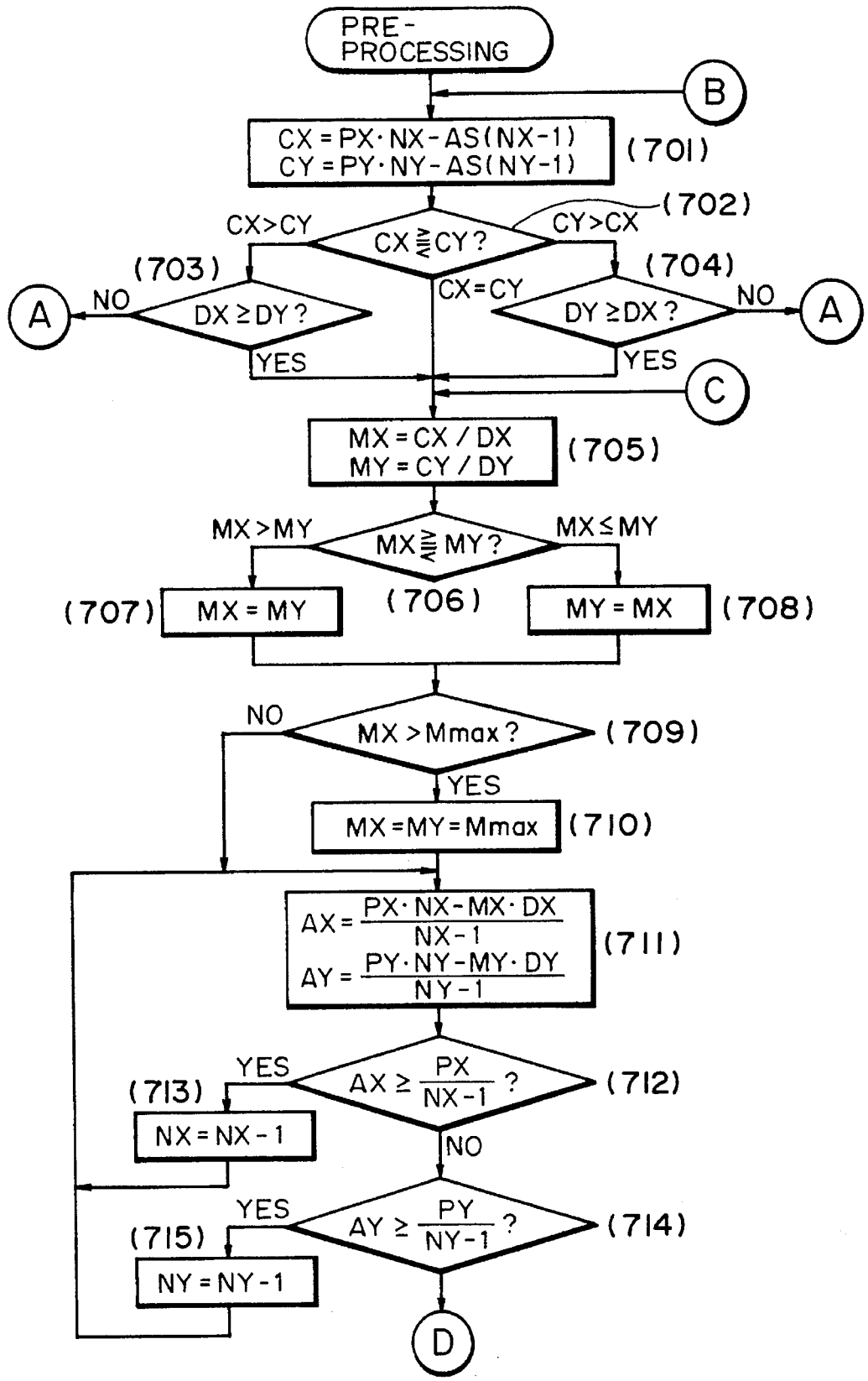
FIGS. 12A and 12B are control flowcharts for the third embodiment.
Figure 12B:
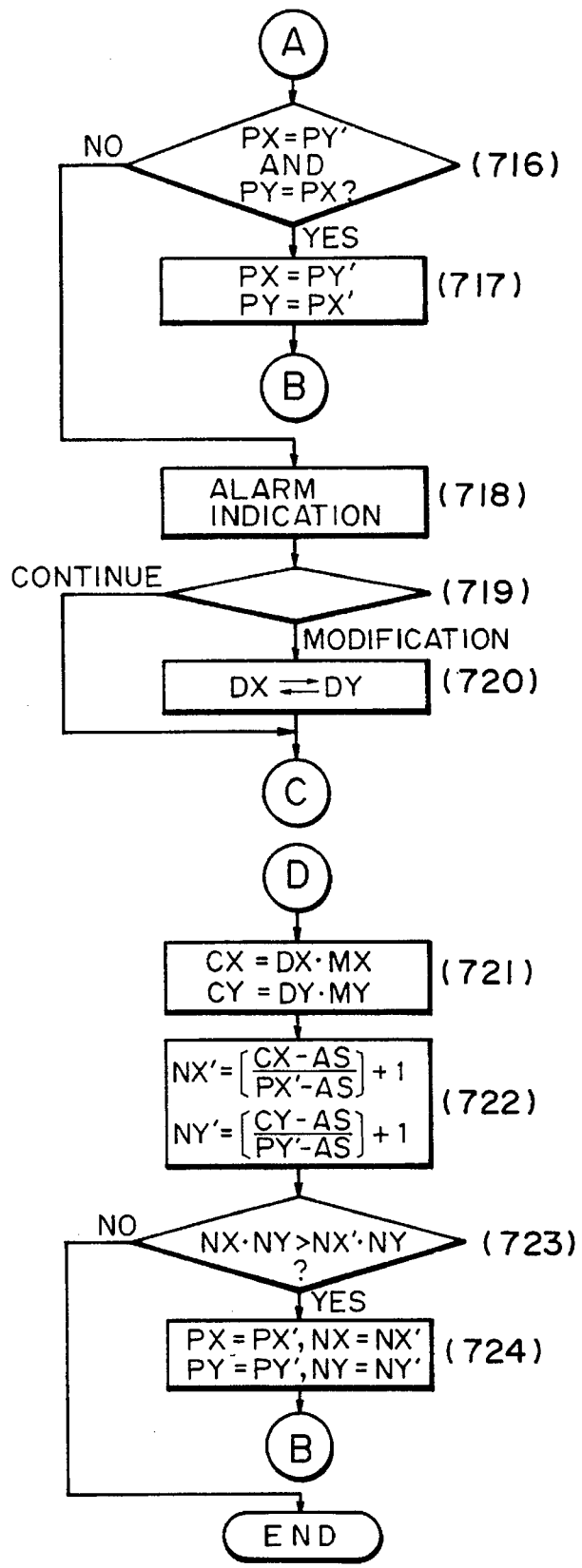

FIGS. 12A and 12B show a pre-processing before the copy operation in the "SHEET PREFERENCE" mode is started and explanation will now be made hereinbelow. In the sheet preference mode, the output size (CX, CY) is obtained (701) from the sheet size (PX, PY) and the numbers NX and NY of constructing sheets which were selected by the operator and the predetermined minimum necessary overlap amount As. Then, the magnitude relation between CX and CY and the magnification relation between DX and DY as an original size are compared, thereby checking whether the output size coincides with the direction of the original or not (702, 703, 704).

If both directions are different, a check is made to see if there exist sheets whose size is the same as the selected sheet size (PX, PY) and whose direction differs from the selected sheet direction or not (716). In step (716), the size (PX', PY') denotes the size of the paper feeding stage on the side which is not selected. If such a size exists, the paper feeding stage is automatically exchanged, the size is reset (717) the processing routine is returned to steps (701), and the processes are again executed from the beginning. If such a size does not exist, an alarm is indicated by displaying a message such that "The direction of the original differs." (718). If the original was again set in another direction, the values of X (in the lateral direction) and Y (in the vertical direction) of the original size are modified (719, 720). The fact that the original was again set in another direction can be detected by a key input or may be also automatically detected by an original position detecting function (307 in FIG. 1) although its detailed description is omitted here.

The zoom ratios MX and MY are calculated from the output size (CX, CY) and the original size (DX, DY) which were determined as mentioned above (705). In the case of the "XY same-ratio zoom" mode, either smaller one of MX and MY is set to MX and MY (706, 707, 708). Further, if MX and MY exceed the maximum magnification Mmax in the specifications (709), Mmax is set to MX and MY (710).

The overlap amounts AX and AY are calculated from the magnifications MX and MY which are obtained as mentioned above, the predetermined sheet size (PX, PY), the numbers NX and NY of constructing sheets, and the original size (DX, DY) (711).

A check is then made to see if the sheets have been expended in vain or not in steps (712) to (715). The discriminating conditions in such checking processes will be first described.

It is now assumed that N sheets of the size P are necessary to copy the original of the size D at a magnification of M. In this case, the overlap amount A of the sheets is set to $$A = \frac{NP - DM}{N-1}.$$

At this time, if (N−1) is the minimum number of constructing sheets instead of N, DM≦(N−1)P. Therefore, $$A \geq \frac{P}{N-1}.$$

That is, if $$A \geq \frac{P}{N-1},$$

this value is not regarded as the minimum number of constructing sheets and at least one sheet can be reduced.

From the above points, the overlap amounts AX and AY are repetitively calculated while decreasing the numbers NX and NY of sheets one by one until $$A < \frac{P}{N-1}$$

in the main scan direction and the subscan direction (712 to 715).

Then, the final output size (CX, CY) is obtained (721). The numbers NX' and NY' of constructing sheets in the case of using the paper size (PX', PY') of the paper feed stage on the side which was not selected are calculated (722) by using the final output size. In step (722), [⅖] denotes the maximum integer smaller than ⅖. The equation of (722) is obtained by CX=PX'·NX'−As(NX'−1). When NX·NY≦NX'·NY' (723), the pre-processing is finished. The copy operation is started hereinafter in accordance with the flow in step (609) and subsequent steps in FIG. 6-1. When NX·NY>NX'·NY' (723), the sheet size and the numbers of sheets are exchanged (724) and the pre-processing is again executed from (701).

The rough output size is known on the basis of the sheet size and the numbers of constructing sheets which were selected by the operator in accordance with the above procedure. After that, the direction of the sheets and the direction of the original due to a misunderstanding of the operator are corrected. Further, the optimum parameters are automatically detected from the sheet size and the numbers of constructing sheets which were selected and can be corrected. The operability can be further improved.

Moreover, as a fourth embodiment, by constructing in a manner such that all of the parameters which are necessary for the multi-page enlargement are displayed and can be arbitrarily modified, a copy output without any error which can be satisfied by the operator can be given.

FIG. 10C shows an example of such a display.

① and ② denote original sizes; ③ and ④ indicate erasing widths of the peripheral portion which have been described in the second embodiment; ⑤ and ⑥ copy magnifications; ⑦ a sheet size; ⑧ and ⑨ numbers of constructing sheets; ⑩ total number of sheets; ⑪ and ⑫ overlap amounts; and ⑬ and ⑭ final output sizes.

The parameters to be changed are selected from among the above parameters excluding the parameter ⑩ by using the control keys 117 and 118. The selected parameters are modified by the control keys 115 and 116. Thus, the other relative parameters also change, so that the copy state can be known at a glance.

For instance, if the values of ③ and ④ are set to "0", the values of ⑧ and ⑨ are set to "4", ⑩ is set to "16", ⑪ is set to "96", ⑫ is set to "133", ⑬ is set to "900", and ⑭ is set to "1280".

As described above, by dividing the original image into a plurality of areas and by copying the respective areas onto different recording materials, when copying the image of the size larger than the recording material, by automatically modifying the size in accordance with the overlap amounts of the recording materials, the optimum copy output without a vain portion can be provided. On the other hand, when the modification is necessary, the operation is once stopped, the modified parameters are displayed, and the judgment of the operator is waited, so that a fear such that the output which is not desired by the operator is executed is also eliminated. On the other hand, a series of parameters from the original until the copy output are displayed and can be modified, so that the operator can recognize the whole work and the operability is further improved.

Although the present invention has been shown and described with respect to the preferred embodiments, the invention is not limited to the foregoing embodiments but many modifications and variations are possible within the spirit and scope of the appended claims of the invention.

I claim:

1. An image reproducing apparatus comprising:

setting means for setting a desired enlargement ratio;

dividing means for dividing an original image into a plurality of images;

reproducing means for respectively enlarging the divided images and for respectively reproducing them onto different reproducing materials, said reproducing means partially-overlappingly reproducing the divided images onto the reproducing materials; and selecting means for selecting an enlargement ratio different from the desired enlargement ratio set by said setting means, such that an overlap amount of the respective divided images reproduced by said reproducing means is held within a predetermined range.

2. An apparatus according to claim 1, further having scanning means for scanning the original image.

3. An apparatus according to claim 1, wherein said selecting means obtains the overlap amount on the basis of the desired enlargement ratio and selects an enlargement ratio different from the desired enlargement ratio if the obtained overlap amount is not held within the predetermined range.

4. An apparatus according to claim 3, wherein said selecting means selects the enlargement ratio such that the overlap amount reproduced by said reproducing means is smaller than the obtained overlap amount.

5. An apparatus according to claim 1, wherein said selecting means obtains a division number for dividing the original image and the overlap amount, in accordance with the desired enlargement ratio.

6. An apparatus according to claim 5, wherein said selecting means selects the enlargement ratio such that the original image is divided into plural images different in number from the obtained division number, if the obtained overlap amount is an inadequate value.

7. An apparatus according to claim 6, wherein said selecting means selects the enlargement ratio such that the original image is divided into plural images less in number than the obtained division number.

8. An apparatus according to claim 1, wherein said selecting means selects the enlargement ratio respectively in a longitudinal direction and a lateral direction of the original image such that the overlap amount is held within the predetermined range, and if the enlargement ratios respectively selected in the longitudinal and lateral directions are different from each other, said selecting means selects one of the enlargement ratios respectively selected in the longitudinal and lateral directions for enlargement in both directions.

9. An apparatus according to claim 8, wherein said determining means determines the area to be reproduced so as to reduce the overlap amount.

10. An image reproducing apparatus comprising:

dividing means for dividing an original image into a plurality of images;

reproducing means for respectively enlarging the divided images at a set enlargement ratio and for respectively reproducing them onto different reproducing materials, said reproducing means partially-overlappingly reproducing the divided images onto the reproducing materials; and determining means for determining in the original image an area to be reproduced by said reproducing means in accordance with the enlargement ratio, such that an overlap amount of the respective divided images overlappingly reproduced by said reproducing means is held within a predetermined range.

11. An apparatus according to claim 10, further having setting means for setting a desired enlargement ratio, and wherein said reproducing means enlarges the image in accordance with the enlargement ratio set by said setting means.

12. An apparatus according to claim 10, further having scanning means for scanning the original image.

13. An apparatus according to claim 10, wherein said determining means obtains the overlap amount of the respective divided images reproduced by said reproducing means, in accordance with the enlargement ratio.

14. An apparatus according to claim 13, wherein said determining means determines the area to be reproduced such that the overlap amount is held within the predetermined range.

15. An apparatus according to claim 13, wherein said determining means obtains the overlap amount in a case where an entire surface of the original image is reproduced, in accordance with the set enlargement ratio, and if the obtained overlap amount is not within the predetermined range, said determining means determines the area other than a peripheral portion of the original image as the area to be reproduced.

16. An apparatus according to claim 10, wherein said determining means determines the area other than a peripheral area of the original image as the area to be reproduced.

17. An image reproducing apparatus comprising:

input means for inputting a size of a reproducing material and a number of sheets of reproducing material;

determining means for determining an enlargement ratio of an original image in accordance with the size of the reproducing material and the number of sheets of reproducing material; and reproducing means for dividing the original image into a plurality of images, for enlarging each of the divided images in accordance with the determined enlargement ratio, and for respectively reproducing the divided images onto the respective sheets of reproducing material.

18. An apparatus according to claim 17, further having scanning means for scanning the original image.

19. An apparatus according to claim 17, wherein the reproducing means reproduces the divided images onto the plurality sheets of reproducing materials.

20. An apparatus according to claim 17, further comprising display means for displaying a pattern for multi-page enlargement reproducing output.

21. An apparatus according to claim 17, wherein said input means inputs a pattern for multi-page enlargement reproducing output.

22. An apparatus according to claim 21, wherein the pattern includes information as to a direction of orientation of the reproducing material.

23. An apparatus according to claim 21, wherein the pattern includes the number of sheets of the reproducing material to be used in a longitudinal direction and the number of sheets of the reproducing material to be used in a lateral direction.

24. An apparatus according to claim 17, further comprising judging means for judging whether or not the original image can be divided using reproducing materials less in number than the number input by said input means, and wherein said judging means controls said reproducing means such that the original image is divided (if possible) using reproducing materials less in number than the number of the reproducing materials input by said input means.

25. An apparatus according to claim 17, wherein said input means comprises:

display means;

means for causing said display means to display each of plural division patterns, each representing how many images a given image is divided into in a longitudinal direction and a lateral direction, respectively; and selection means for selecting, as the number of sheets of reproducing material, one of the displayed plural division patterns.

26. An apparatus according to claim 25, wherein the division pattern includes information representing whether each of the divided images is reproduced in a longitudinal-long size or a lateral-long size.

27. An apparatus according to claim 17, wherein said input means can further input an enlargement ratio, and said reproducing means enlarges, when the enlargement ratio is input by said input means, each of the divided images in accordance with the enlargement ratio input by said input means.

28. A method for determining a division number in a case of dividing and reproducing an image, comprising the steps of:

inputting a division size representing what size the image is divided into and the division number representing how many images the image is divided into;

obtaining an overlap length to be overlappingly reproduced in a case where the image is divided into the division number of images having the division size; and selecting, if the obtained overlap length has an inadequate value, a division number different from the division number input in said inputting step such that the overlap length has an adequate value.

29. A method according to claim 28, wherein, in said inputting step, the division size and the division number are input from an operation unit.

30. A method according to claim 28, wherein, in said selecting step, the division number is reduced such that the overlap length becomes shorter.

31. A method according to claim 28, wherein the division number represents how many images the image is divided into in a longitudinal direction and a lateral direction, respectively.

32. A method according to claim 31, wherein, in said obtaining step, a magnification for zooming the image to be processed is obtained respectively in the longitudinal and lateral directions, in accordance with the division size and the division number, and one of the obtained respective magnifications is chosen and the overlap length is obtained at the chosen magnification.

33. A method for detecting an input error in an image division and reproduction mode, comprising the steps of:

inputting the image division and reproduction mode which represents how an image is to be divided and reproduced; and displaying, in a case where the image to be divided and reproduced is divided and reproduced in the image division and reproduction mode, an indication that the image division and reproduction mode is erroneously input if an overlap length of the respective divided and reproduced images is not held within a predetermined range.

34. A method according to claim 33, wherein said division and reproduction mode includes a division size representing what size of images the image is divided into and a division number representing how many images the image is divided into.

35. A method according to claim 34, wherein said division and reproduction mode includes a division number representing how many images the image is divided into respectively in a longitudinal direction and a lateral direction.

36. A method according to claim 33, wherein the division and reproduction mode includes a magnification.

37. A method according to claim 36, wherein, in said displaying step, the overlap length is obtained in accordance with the magnification.

38. A method according to claim 33, wherein, in said inputting step, the division and reproduction mode is input from an operation unit.

39. A method for performing a multi-page enlargement process, wherein, in the multi-page enlargement process, an original image is divided into plural images which are enlarged and reproduced on different reproducing materials, said method comprising the steps of:

inputting a size of the reproducing materials and a number of the reproducing materials;

determining an enlargement ratio according to the size of the reproducing materials and the number of the reproducing materials; and forming an image on the reproducing materials, wherein said forming step includes the step of controlling the multi-page enlargement process according to the size of the reproducing materials and the number of the reproducing materials, and the step of enlarging each of the plural images according to the enlargement ratio.

40. A method according to claim 39, wherein, in said inputting step, information representing how many images the original image is divided into in a longitudinal direction and a lateral direction, respectively, is input.

41. A method according to claim 39, wherein, in said determining step, the enlargement ratio is determined according to the size of the reproducing materials, the number of the reproducing materials and the size of the original image.

42. A method according to claim 41, wherein the size of the original image is detected using an original image reader.

43. A method according to claim 39, wherein, in said inputting step, the size of the reproducing materials and the number of the reproducing materials are input via a keyboard.

44. A method according to claim 39, wherein the reproducing material has a longer side and a shorter size and, in said inputting step, information representing whether the reproducing material is to be recorded on with the longer side or with the shorter side at the top, is also input.

45. An image reproducing method, comprising the steps of:

setting a desired enlargement ratio;

dividing an original image into a plurality of images;

respectively enlarging the divided images and respectively reproducing them onto different reproducing materials partially-overlappingly; and selecting an enlargement ratio different from the desired enlargement ratio set in said setting step, such that an overlap amount of the respective divided images reproduced in said enlarging and reproducing step is held within a predetermined range.

46. An image reproducing method, comprising the steps of:

dividing an original image into a plurality of images;

respectively enlarging the divided images at a set enlargement ratio and respectively reproducing them onto different reproducing materials partially-overlappingly; and determining in the original image an area to be reproduced in said enlarging and reproducing step, such that an overlap amount of the respective divided image overlappingly reproduced in said enlarging and reproducing step is held within a predetermined range.

* * * * *

UNITED STATES PATENT AND TRADEMARK OFFICE
CERTIFICATE OF CORRECTION

PATENT NO. : 5,566,005

DATED : October 15, 1996

INVENTOR(S) : MASANORI YAMADA

It is certified that error appears in the above-identified patent and that said Letters Patent is hereby corrected as shown below:

ON THE TITLE PAGE

At [57] ABSTRACT, line 14, "the" (first occurence) should read --such--.

COLUMN 1

Line 31, "X" should read --"X"--.
    Line 34, "(I.e., CX by CY)." should read --(CX, CY) (i.e., CX by CY).--.

COLUMN 2

Line 27, "to" (second occurrence) should be deleted.
    Line 54, "10A to 10C," should read --10(A) to 10(C),--.
    Line 55, "11A to 11E," should read --11(A) to 11(E),--.

COLUMN 3

Line 41, "an ROM; an RAM;" should read --a ROM; a RAM;--.
    Line 42, "and" should read --and an--.

COLUMN 6

Line 18, "[(C/P)]" should read --([C/P]--.
    Line 19, "C/P." should read --C/P.)--.

UNITED STATES PATENT AND TRADEMARK OFFICE
CERTIFICATE OF CORRECTION

PATENT NO. : 5,566,005

DATED : October 15, 1996

INVENTOR(S) : MASANORI YAMADA

It is certified that error appears in the above-identified patent and that said Letters Patent is hereby corrected as shown below:

COLUMN 8

Line 29, "10A." should read --10(A).--.
    Line 42, "to" should read --by--.
    Line 55, "each direction, size" should
           read --the size (PX, PY) in each direction,--.
    Line 56, "(PX, PY) in the" should be deleted.

COLUMN 10

Line 7, "10B." should read --10(B).--.
    Line 15, "11A-E shows" should read --11(A)-(E) show--.
    Line 19, "11A" should read --11(A)--.
    Line 22, "11B." should read --11(B).--.
    Line 28, "11B." should read --11(B).--.
    Line 31, "(B) in FIG. 11," should read --FIG. 11(B),--.
    Line 32, "(C) in FIG. 11." should read --FIG 11(C).--.
    Line 38, "11C," should read --11(C),--.
    Line 50, "11C," should read --11(C),--.
    Line 52, "11D." should read --11(D).--.
    Line 56, "11B," should read --11(B),--.
    Line 58, "11E. In FIG. 11E," should
           read --11(E). In FIG. 11(E),--.

COLUMN 11

Line 64, "reduced" should read --eliminated--.

COLUMN 12

Line 57, "once" should be deleted.

UNITED STATES PATENT AND TRADEMARK OFFICE
CERTIFICATE OF CORRECTION

PATENT NO. : 5,566,005

DATED : October 15, 1996

INVENTOR(S) : MASANORI YAMADA

It is certified that error appears in the above-identified patent and that said Letters Patent is hereby corrected as shown below:

<u>COLUMN 14</u>

Line 45, "means" should read
          --means partially-overlappingly--.
    Line 46, "plurality" should read --plurality of--.

<u>COLUMN 16</u>

Line 49, "size" should read --side--.

Signed and Sealed this

Twentieth Day of May, 1997

Attest:

BRUCE LEHMAN

*Attesting Officer*       *Commissioner of Patents and Trademarks*